United States Patent
Goodman et al.

(10) Patent No.: US 7,484,042 B2
(45) Date of Patent: Jan. 27, 2009

(54) DATA PROCESSING SYSTEM AND METHOD FOR PREDICTIVELY SELECTING A SCOPE OF A PREFETCH OPERATION

(75) Inventors: Benjiman L. Goodman, Cedar Park, TX (US); William J. Starke, Round Rock, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 11/465,587

(22) Filed: Aug. 18, 2006

(65) Prior Publication Data

US 2008/0046658 A1 Feb. 21, 2008

(51) Int. Cl.
*G06F 13/00* (2006.01)

(52) U.S. Cl. .................. 711/137; 711/141; 711/144; 711/145; 712/237; 712/238; 712/239; 712/240

(58) Field of Classification Search .............. 711/137, 711/141, 144, 145; 712/237, 238, 239, 240
See application file for complete search history.

(56) References Cited

U.S. PATENT DOCUMENTS

| | | | |
|---|---|---|---|
| 6,629,268 B1 * | 9/2003 | Arimilli et al. | 714/42 |
| 2003/0126232 A1 * | 7/2003 | Mogul et al. | 709/219 |
| 2005/0138628 A1 * | 6/2005 | Bradford et al. | 718/107 |
| 2006/0095679 A1 * | 5/2006 | Edirisooriya | 711/137 |
| 2006/0271744 A1 * | 11/2006 | Goodman et al. | 711/141 |
| 2007/0033385 A1 * | 2/2007 | Smaus et al. | 712/242 |
| 2007/0067382 A1 * | 3/2007 | Sun | 709/203 |
| 2007/0168639 A1 * | 7/2007 | McCalpin et al. | 711/206 |

* cited by examiner

*Primary Examiner*—Hong Kim
(74) *Attorney, Agent, or Firm*—Casimer K. Salys; Dillon & Yudell LLP

(57) ABSTRACT

A data processing system includes at least first and second coherency domains each containing at least one processing unit, an interconnect fabric coupling the first and second coherency domains, and a cache memory within the first coherency domain. The cache memory comprises a data array, a cache directory of contents of the data array, and a cache controller including a prefetch predictor. The prefetch predictor determines a predicted scope of broadcast on the interconnect fabric for a first prefetch operation having a first target address based upon a scope of a previous second prefetch operation having a different second target address. The cache controller issues the first prefetch operation on the interconnect fabric with the predicted scope.

13 Claims, 10 Drawing Sheets

US 7,484,042 B2

DATA PROCESSING SYSTEM AND METHOD FOR PREDICTIVELY SELECTING A SCOPE OF A PREFETCH OPERATION

CROSS-REFERENCE TO RELATED APPLICATION(S)

The present application is related to U.S. patent application Ser. Nos. 11/140,821, filed on May 31, 2005 and 11/278,825, filed on Apr. 6, 2006, which are assigned to the assignee of the present invention and incorporated herein by reference in their entireties.

BACKGROUND OF THE INVENTION

1. Technical Field

The present invention relates in general to data processing and, in particular, to data processing in a data processing system having multiple scopes of broadcast communication.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache states stored in association with the cache lines of each cache hierarchy, as well as a set of coherency messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherency state transition in the cache hierarchy of the requester and/or the recipients of a memory access request.

Conventional data processing system designs have generally assumed that maintaining cache coherency requires a global broadcast of all operations throughout the data processing system. That is, that all operations must be received by all cache hierarchies in an SMP computer system. The present invention recognizes, however, that the requirement of global broadcast of operations creates a significant impediment to the scalability of SMP computer systems and, in particular, consumes an increasing amount of the bandwidth of the system interconnect as systems scale.

SUMMARY OF THE INVENTION

In view of the foregoing, the present invention provides an improved cache coherent data processing system, cache system and method of data processing in a cache coherent data processing system.

In one embodiment, operations transmitted on the interconnect of a data processing system are permitted to have varying scopes of broadcast. That is, some operations may be transmitted to all or most processing units in the data processing system (i.e., a larger scope of broadcast), while other operations may be transmitted to a more restricted set processing units (i.e., a smaller scope of broadcast). A prefetch predictor is maintained that indicates a history of prior scopes of broadcast for one or more previous prefetch operations transmitted on the interconnect of the data processing system. A scope of broadcast of a subsequent prefetch operation is then predictively selected by reference to the prefetch predictor.

In a further embodiment, a data processing system includes at least first and second coherency domains each containing at least one processing unit, an interconnect fabric coupling the first and second coherency domains, and a cache memory within the first coherency domain. The cache memory comprises a data array, a cache directory of contents of the data array, and a cache controller including a prefetch predictor. The prefetch predictor determines a predicted scope of broadcast on the interconnect fabric for a first prefetch operation having a first target address based upon a scope of a previous second prefetch operation having a different second target address. The cache controller issues the first prefetch operation on the interconnect fabric with the predicted scope.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

I. Exemplary Data Processing System

Figure 1:
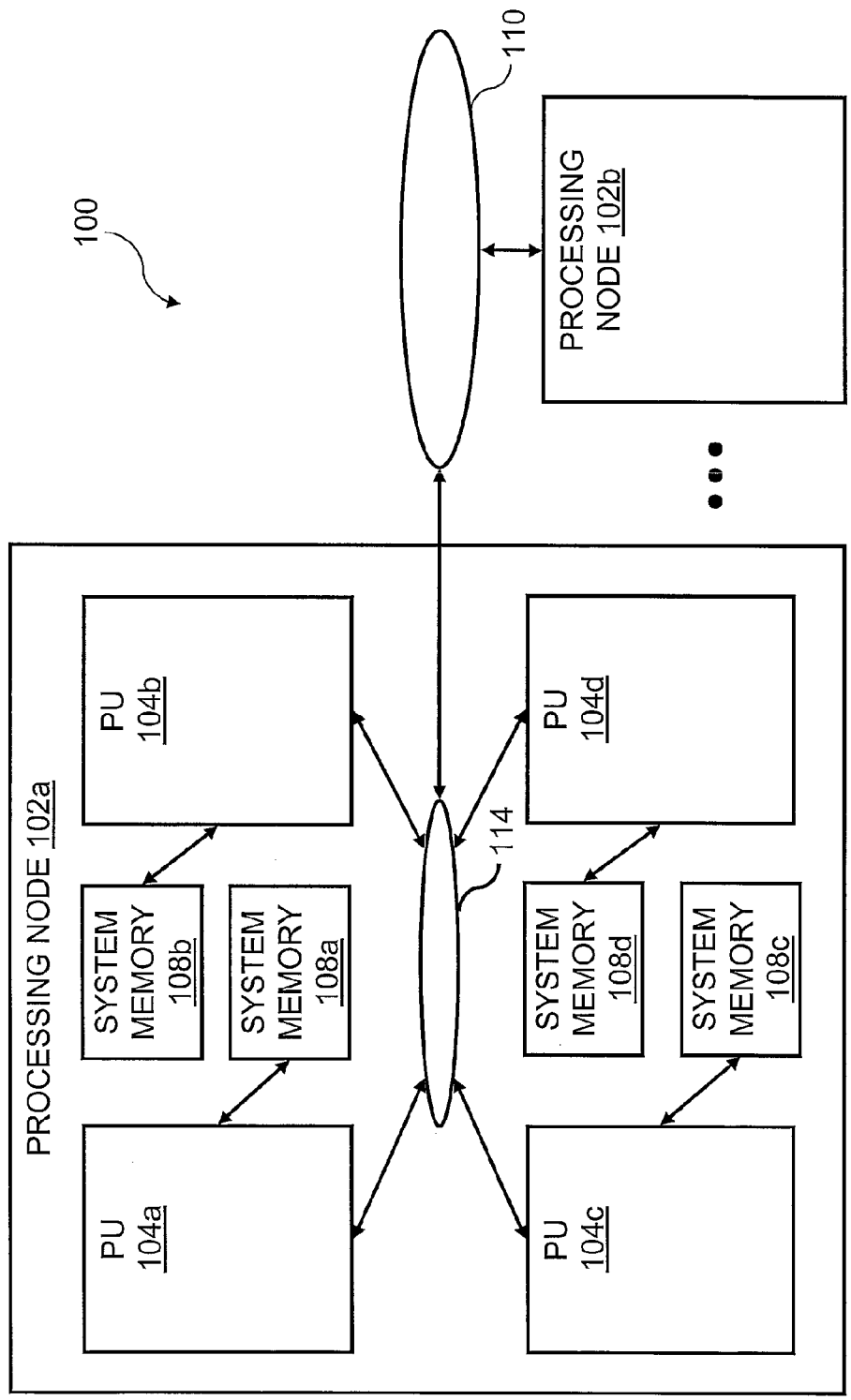
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102*a*, 102*b* for processing data and instructions. Processing nodes 102*a*, 102*b* are coupled to a system interconnect 110 for conveying address, data and control information. System interconnect 110 maybe implemented, for example, as a bused interconnect, a switched interconnect or a hybrid interconnect.

In the depicted embodiment, each processing node 102 is realized as a multi-chip module (MCM) containing four processing units 104*a*-104*d*, each preferably realized as a respective integrated circuit. The processing units 104*a*-104*d* within each processing node 102 are coupled for communication by a local interconnect 114, which, like system interconnect 110, may be implemented with one or more buses and/or switches.

The devices coupled to each local interconnect 114 include not only processing units 104, but also one or more system memories 108*a*-108*d*. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
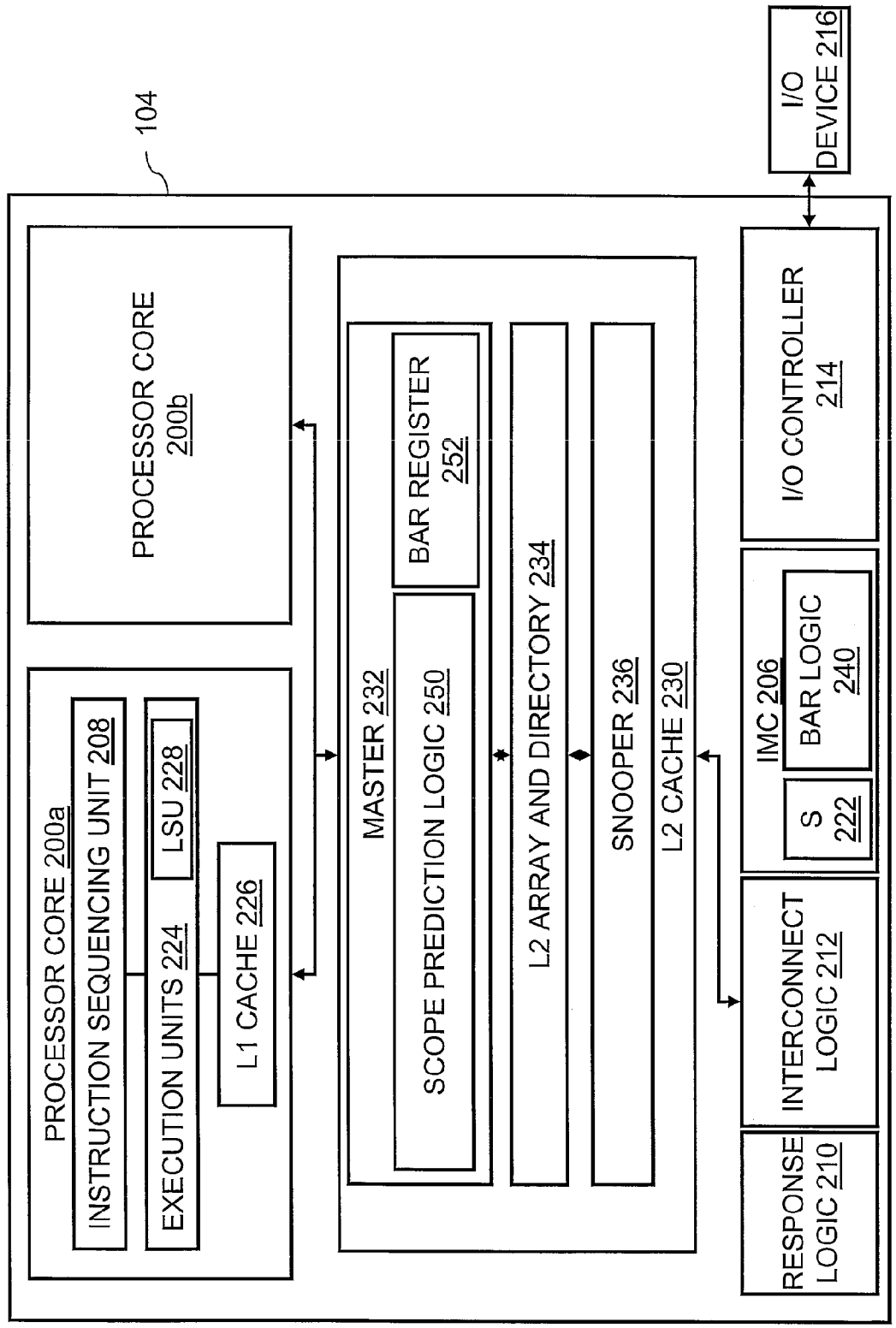
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200*a*, 200*b* for independently processing instructions and data. Each processor core 200 includes at least an instruction sequencing unit (ISU) 208 for prefetching and demand fetching instructions and for ordering instructions for execution by one or more execution units 224. Execution units 224 preferably include a load-store unit (LSU) 228 for executing memory access instructions that references a memory block or cause the generation of an operation referencing a memory block. In a preferred embodiment, each processor core 200 is capable of simultaneously executing instructions within two or more hardware threads of execution. Each processor core 200 preferably supports multiple concurrent prefetching streams, as described in U.S. patent application Ser. No. 11/278,825 incorporated by reference above.

The operation of each processor core 200 is supported by a multi-level volatile memory hierarchy having at its lowest level shared system memories 108*a*-108*d*, and at its upper levels one or more levels of cache memory. In the depicted embodiment, each processing unit 104 includes an integrated memory controller (IMC) 206 that controls read and write access to a respective one of the system memories 108*a*-108*d* within its processing node 102 in response to requests received from processor cores 200*a*-200*b* and operations snooped by a snooper (S) 222 on the local interconnect 114. IMC 206 determines the addresses for which it is responsible by reference to base address register (BAR) logic 240.

In the illustrative embodiment, the cache memory hierarchy of processing unit 104 includes a store-through level one (L1) cache 226 (which may be bifurcated into separate L1 instruction and data caches) within each processor core 200 and a level two (L2) cache 230 shared by all processor cores 200*a*, 200*b* of the processing unit 104. L2 cache 230 includes an L2 array and directory 234 and a cache controller comprising a master 232 and a snooper 236. Master 232 initiates transactions on local interconnect 114 and system interconnect 110 and accesses L2 array and directory 234 in response to memory access (and other) requests received from the associated processor cores 200*a*-200*b*. Master 232 includes BAR register 252, which indicates which addresses reside in the system memories 108 in its processing node 102, and scope prediction logic 250, which, as described further below, maybe utilized to predict scope of operations transmitted on the interconnect fabric including local interconnects 114 and system interconnect 110. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, L5 etc.) of on-chip or off-chip in-line, lookaside or victim cache, which may be fully inclusive, partially inclusive, or non-inclusive of the contents the upper levels of cache.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
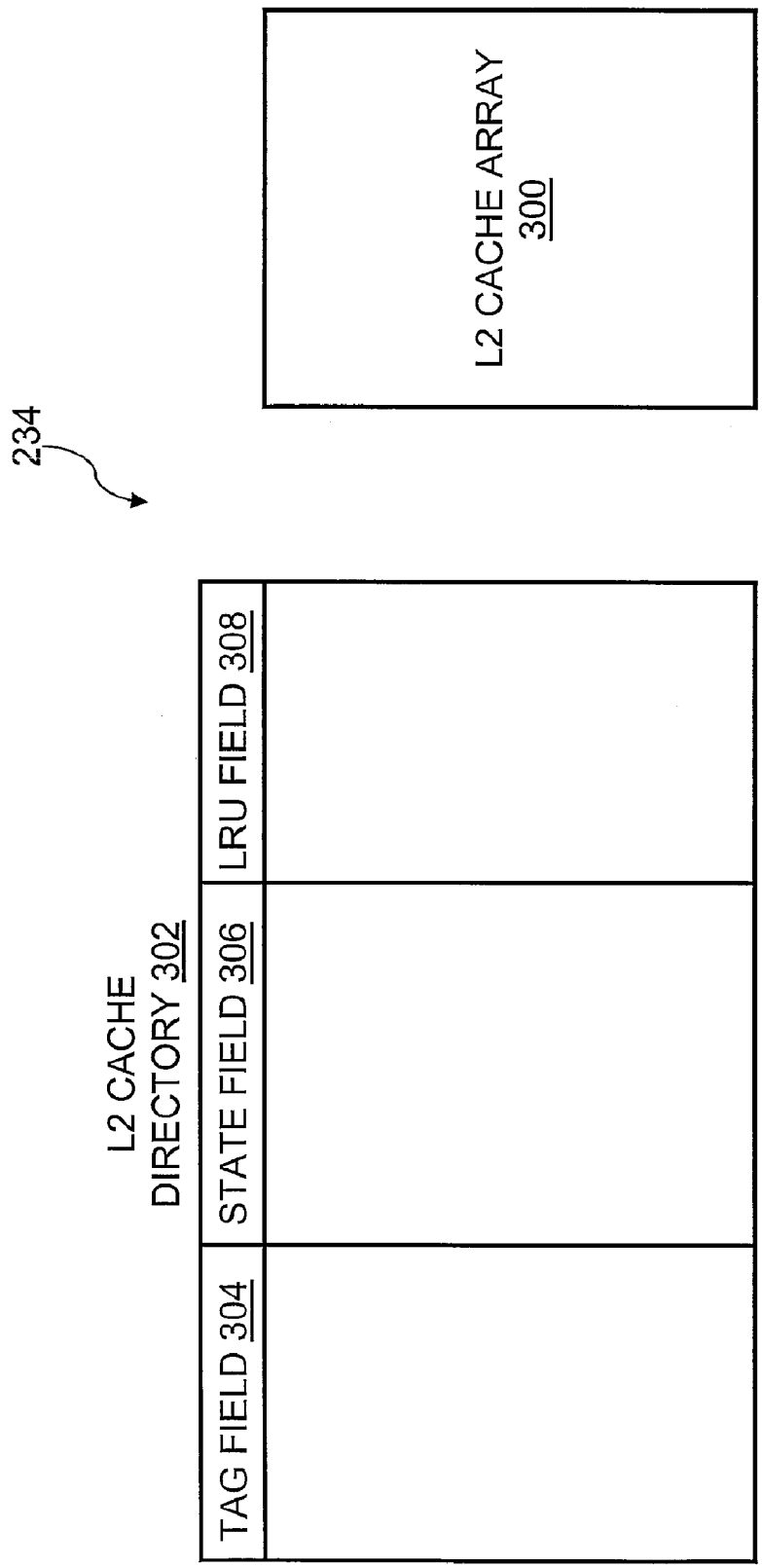
FIG. 3 is a more detailed block diagram of the L2 cache array and directory depicted in FIG. 2.

With reference now to FIG. 3A, there is illustrated a more detailed block diagram of an exemplary embodiment of L2 array and directory 234. As illustrated, L2 array and directory 234 includes a set associative L2 cache array 300 and an L2 cache directory 302 of the contents of L2 cache array 300. As in conventional set associative caches, memory locations in system memories 108 are mapped to particular congruence classes within cache arrays 300 utilizing predetermined index bits within the system memory (real) addresses. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

II. Exemplary Operation

Figure 4:
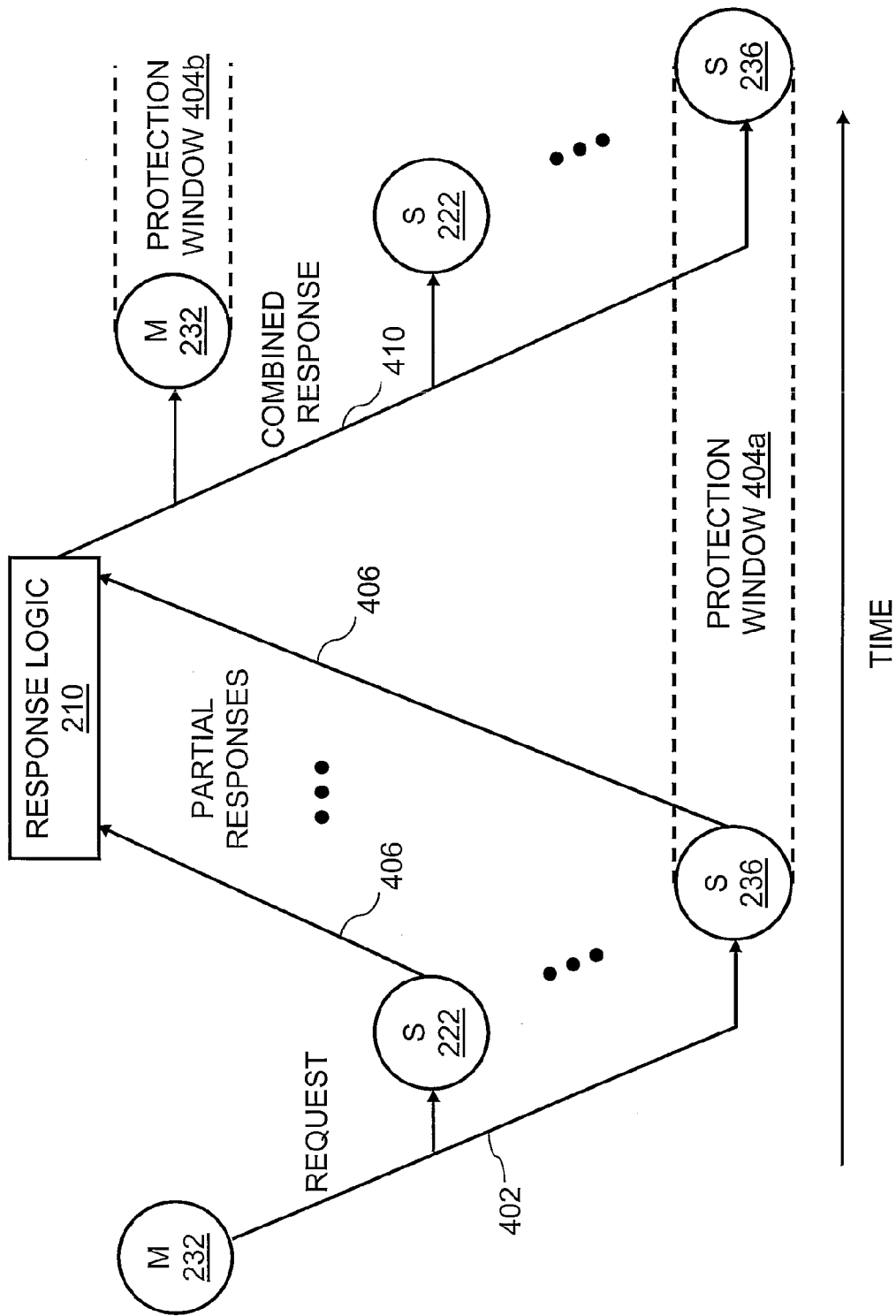
FIG. 4 is a time-space diagram of an exemplary transaction on the system interconnect of the data processing system of FIG. 1.

Referring now to FIG. 4, there is depicted a time-space diagram of an exemplary operation on a local or system interconnect 110, 114 of data processing system 100 of FIG. 1. Although interconnects 110, 114 are not necessarily bused interconnects, operations transmitted on one or more local interconnects 114 and/or system interconnect 114 are referred to herein as "bus operations" to distinguish them from CPU requests transmitted between processor cores 200 and the cache memories residing within their own cache hierarchies.

The illustrated bus operation begins when a master 232 of an L2 cache 230 (or another master, such as an I/O controller 214) issues a request 402 on a local interconnect 114 and/or system interconnect 110. Request 402 preferably includes a transaction type indicating a type of desired access and a resource identifier (e.g., real address) indicating a resource to be accessed by the request. Common types of requests preferably include those set forth below in Table I.

TABLE I

| Request | Description |
|---|---|
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique cached copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 402 is received by the snooper 236 of L2 caches 230, as well as the snoopers 222 of memory controllers 206 (FIG. 1). In general, with some exceptions, the snooper 236 in the same L2 cache 230 as the master 232 of request 402 does not snoop request 402 (i.e., there is generally no self-snooping) because a request 402 is transmitted on local interconnect 114 and/or system interconnect 110 only if the request 402 cannot be serviced internally by a processing unit 104. Each snooper 222, 236 that receives request 402 may provide a respective partial response 406 representing the response of at least that snooper to request 402. A snooper 222 within a memory controller 206 determines the partial response 406 to provide based, for example, whether the snooper 222 is responsible for the request address and whether it has resources available to service the request. A snooper 236 of an L2 cache 230 may determine its partial response 406 based on, for example, the availability of its L2 cache directory 302, the availability of a snoop logic instance within snooper 236 to handle the request, and the coherency state associated with the request address in L2 cache directory 302.

The partial responses of snoopers 222 and 236 are logically combined either in stages or all at once by one or more instances of response logic 210 to determine a system-wide combined response (CR) 410 to request 402. Subject to the scope restrictions discussed below, response logic 210 provides combined response 410 to master 232 and snoopers 222, 236 via its local interconnect 114 and/or system interconnect 110 to indicate the system-wide response (e.g., success, failure, retry, etc.) to request 402. If CR 410 indicates success of request 402, CR 410 may indicate, for example, a data source for a requested memory block, a cache state in which the requested memory block is to be cached by master 232, and whether "cleanup" operations invalidating the requested memory block in one or more L2 caches 230 are required.

In response to receipt of combined response 410, one or more of master 232 and snoopers 222, 236 typically perform one or more operations in order to service request 402. These operations may include supplying data to master 232, invalidating or otherwise updating the coherency state of data cached in one or more L2 caches 230, performing castout operations, writing back data to a system memory 108, etc. If required by request 402, a requested or target memory block may be transmitted to or from master 232 before or after the generation of combined response 410 by response logic 210.

In the following description, the partial response of a snooper 222, 236 to a request and the operations performed by the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 206 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requester in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache coherency state(s) within the L2 cache directory 302 of an L2 cache 230, as described further below with reference to Table II.

Still referring to FIG. 4, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG. 4, the snooper 236 that is the HPC for the memory block specified by the request address of request 402 protects the transfer of ownership of the requested memory block to master 232 during a protection window 404a that extends from the time that snooper 236 determines its partial response 406 until snooper 236 receives combined response 410. During protection window 404a, snooper 236 protects the transfer of ownership by providing partial responses 406 to other requests specifying the same request address that prevent other masters from obtaining ownership until ownership has been successfully transferred to master 232. Master 232 likewise initiates a protection window 404b to protect its ownership of the memory block requested in request 402 following receipt of combined response 410.

Because snoopers 222, 236 all have limited resources for handling the CPU and I/O requests described above, several different levels of partial responses and corresponding CRs are possible. For example, if a snooper 222 within a memory controller 206 that is responsible for a requested memory block has a queue available to handle a request, the snooper 222 may respond with a partial response indicating that it is able to serve as the LPC for the request. If, on the other hand, the snooper 222 has no queue available to handle the request, the snooper 222 may respond with a partial response indicating that is the LPC for the memory block, but is unable to currently service the request.

Similarly, a snooper 236 in an L2 cache 230 may require an available instance of snoop logic and access to L2 cache directory 302 in order to handle a request. Absence of access to either (or both) of these resources results in a partial response (and corresponding CR) signaling a present inability to service the request due to absence of a required resource.

Hereafter, a snooper 222, 236 providing a partial response indicating that the snooper has available all internal resources required to presently service a request, if required, is said to "affirm" the request. For snoopers 236, partial responses affirming a snooped operation preferably indicate the cache state of the requested or target memory block at that snooper 236. A snooper 222, 236 providing a partial response indicating that the snooper 236 does not have available all internal resources required to presently service the request may be said to be "possibly hidden" or "unable" to service the request. Such a snooper 236 is "possibly hidden" or "unable" to service a request because the snooper 236, due to lack of an available instance of snoop logic or present access to L2 cache directory 302, cannot "affirm" the request in sense defined above and has, from the perspective of other masters 232 and snoopers 222, 236, an unknown coherency state.

III. Data Delivery Domains

Conventional broadcast-based data processing systems handle both cache coherency and data delivery through broadcast communication, which in conventional systems is transmitted on a system interconnect to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the system interconnect is multiplied, meaning that system cost rises sharply with system scale as more bandwidth is required for communication over the system interconnect. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce system interconnect bandwidth requirements and access latencies while still retaining the advantages of a broadcast-based system, multiple L2 caches 230 distributed throughout data processing system 100 are permitted to hold copies of the same memory block in a "special" shared coherency state that permits these caches to supply the memory block to requesting L2 caches 230 using cache-to-cache intervention. In order to implement multiple concurrent and distributed sources for shared memory blocks in an SMP data processing system, such as data processing system 100, two issues must be addressed. First, some rule governing the creation of copies of memory blocks in the "special" shared coherency state alluded to above must be implemented. Second, there must be a rule governing which snooping L2 cache 230, if any, provides a shared memory block to a requesting L2 cache 230, for example, in response to a bus read operation or bus RWITM operation.

According to the present invention, both of these issues are addressed through the implementation of data sourcing domains. In particular, each domain within a SMP data processing system, where a domain is defined to include one or more lower level (e.g., L2) caches that participate in responding to data requests, is permitted to include only one cache hierarchy that holds a particular memory block in the "special" shared coherency state at a time. That cache hierarchy, if present when a bus read-type (e.g., read or RWITM) operation is initiated by a requesting lower level cache in the same domain, is responsible for sourcing the requested memory block to the requesting lower level cache. Although many different domain sizes may be defined, in data processing system 100 of FIG. 1, it is convenient if each processing node 102 (i.e., MCM) is considered a data sourcing domain. One example of such a "special" shared state (i.e., Sr) is described below with reference to Table II.

IV. Coherency Domains

While the implementation of data delivery domains as described above improves data access latency, this enhancement does not address the m×n multiplication of traffic volume as system scale increases. In order to reduce traffic volume while still maintaining a broadcast-based coherency mechanism, preferred embodiments of the present invention additionally implement coherency domains, which like the data delivery domains hereinbefore described, can conveniently (but are not required to be) implemented with each processing node 102 forming a separate coherency domain. Data delivery domains and coherency domains can be, but are not required to be coextensive, and for the purposes of explaining exemplary operation of data processing system 100 will hereafter be assumed to have boundaries defined by processing nodes 102.

The implementation of coherency domains reduces system traffic by limiting inter-domain broadcast communication over system interconnect 110 in cases in which requests can be serviced with participation by fewer than all coherency domains. For example, if processing unit 104a of processing node 102a has a bus read operation to issue, then processing unit 104a may elect to first broadcast the bus read operation to all participants within its own coherency domain (e.g., processing node 102a), but not to participants in other coherency domains (e.g., processing node 102b). A broadcast operation transmitted to only those participants within the same coherency domain as the master of the operation is defined herein as a "local operation". If the local bus read operation can be serviced within the coherency domain of processing unit 104a, then no further broadcast of the bus read operation is performed. If, however, the partial responses and combined response to the local bus read operation indicate that the bus read operation cannot be serviced solely within the coherency domain of processing node 102a, the scope of the broadcast may then be extended to include, in addition to the local coherency domain, one or more additional coherency domains.

In a basic implementation, two broadcast scopes are employed: a "local" scope including only the local coherency domain and a "global" scope including all of the other coherency domains in the SMP data processing system. Thus, an operation that is transmitted to all coherency domains in an SMP data processing system is defined herein as a "global operation". Importantly, regardless of whether local operations or operations of more expansive scope (e.g., global operations) are employed to service operations, cache coherency is maintained across all coherency domains in the SMP data processing system. Examples of local and global operations are described in detail in U.S. patent application Ser. No. 11/055,697, which is incorporated herein by reference in its entirety.

In a preferred embodiment, the scope of an operation is indicated in a bus operation by a local/global scope indicator (signal), which in one embodiment may comprise a 1-bit flag. Forwarding logic 212 within processing units 104 preferably determines whether or not to forward an operation, received via local interconnect 114 onto system interconnect 110 based upon the setting of the local/global scope indicator (signal) in the operation.

V. Domain Indicators

Figure 5:
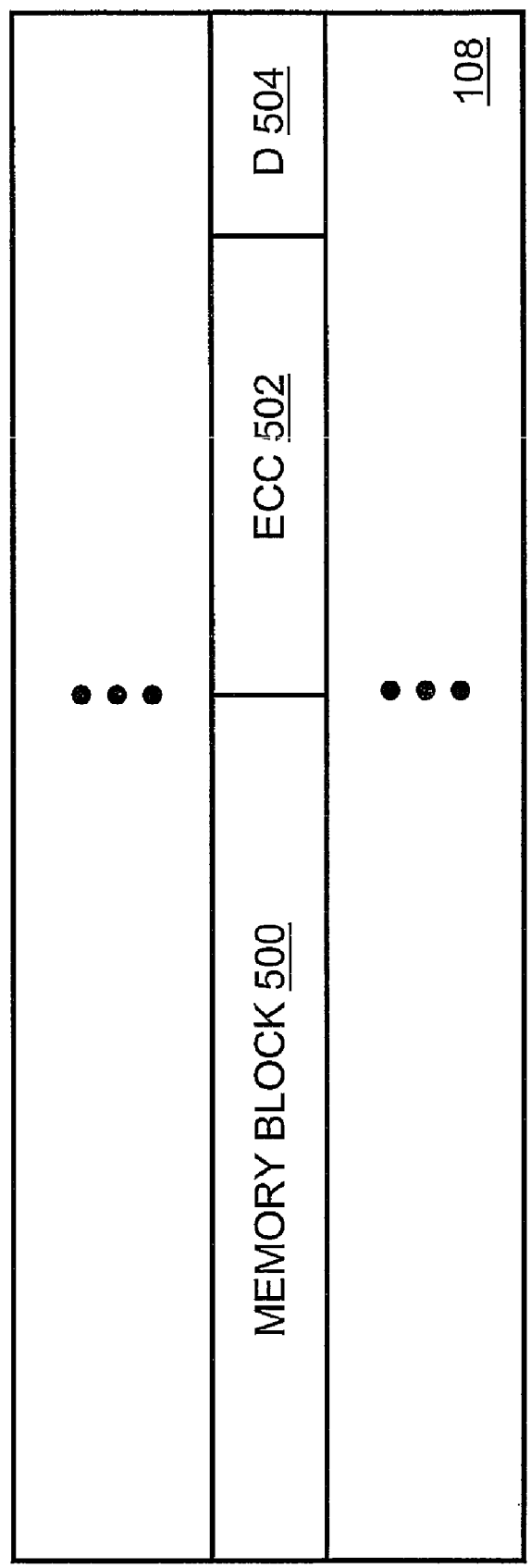
FIG. 5 illustrates a domain indicator in accordance with a preferred embodiment of the present invention.

In order to limit the issuance of unneeded local operations and thereby reduce operational latency and conserve additional bandwidth on local interconnects, the present invention preferably implements a domain indicator per memory block that indicates whether or not a copy of the associated memory block is cached outside of the local coherency domain. For example, FIG. 5 depicts a first exemplary implementation of a domain indicator in accordance with the present invention. As shown in FIG. 5, a system memory 108, which may be implemented in dynamic random access memory (DRAM), stores a plurality of memory blocks 500. System memory 108 stores in association with each memory block 500 an associated error correcting code (ECC) 502 utilized to correct errors, if any, in memory block 500 and a domain indicator 504. Although in some embodiments of the present invention, domain indicator 504 may identify a particular coherency domain (i.e., specify a coherency domain or node ID), it is hereafter assumed that domain indicator 504 is a 1-bit indicator that is set (e.g., to '1' to indicate "local") if the associated memory block 500 is cached, if at all, only within the same coherency domain as the memory controller 206 serving as the LPC for the memory block 500. Domain indicator 504 is reset (e.g., to '0' to indicate "global") otherwise. The setting of domain indicators 504 to indicate "local" may be implemented imprecisely in that a false setting of "global" will not induce any coherency errors, but may cause unneeded global broadcasts of operations.

Memory controllers 206 (and L2 caches 230) that source a memory block in response to an operation preferably transmit the associated domain indicator 504 in conjunction with the requested memory block.

VI. Exemplary Coherency Protocol

The present invention preferably implements a cache coherency protocol designed to leverage the implementation of data delivery and coherency domains as described above. In a preferred embodiment, the cache coherency states within the protocol, in addition to providing (1) an indication of whether a cache is the HPC for a memory block, also indicate (2) whether the cached copy is unique (i.e., is the only cached copy system-wide) among caches at that memory hierarchy level, (3) whether and when the cache can provide a copy of the memory block to a master of a request for the memory block, (4) whether the cached image of the memory block is consistent with the corresponding memory block at the LPC (system memory), and (5) whether another cache in a remote coherency domain possibly) holds a cache entry having a matching address. These five attributes can be expressed, for example, in an exemplary variant of the well-known MESI (Modified, Exclusive, Shared, Invalid) protocol summarized below in Table II.

TABLE II

| Cache state | HPC? | Unique? | Data source? | Consistent with LPC? | Cached outside local domain? | Legal concurrent states |
|---|---|---|---|---|---|---|
| M | yes | yes | yes, before CR | no | no | I, Ig, In (& LPC) |
| Me | yes | yes | yes, before CR | yes | no | I, Ig, In (& LPC) |
| T | yes | unknown | yes, after CR if none provided before CR | no | unknown | Sr, S, I, Ig, In (& LPC) |
| Tn | yes | unknown | yes, after CR if none provided before CR | no | no | Sr, S, I, Ig, In (& LPC) |
| Te | yes | unknown | yes, after CR if none provided before CR | yes | unknown | Sr, S, I, Ig, In (& LPC) |
| Ten | yes | unknown | yes, after CR if none provided before CR | yes | no | Sr, S, I, Ig, In (& LPC) |

TABLE II-continued

| Cache state | HPC? | Unique? | Data source? | Consistent with LPC? | Cached outside local domain? | Legal concurrent states |
|---|---|---|---|---|---|---|
| Sr | no | unknown | yes, before CR | unknown | unknown | T, Tn, Te, Ten, S, I, Ig, In (& LPC) |
| S | no | unknown | no | unknown | unknown | T, Tn, Te, Ten, Sr, S, I, Ig, In (& LPC) |
| I | no | n/a | no | n/a | unknown | M, Me, T, Tn, Te, Ten, Sr, S, I, Ig, In (& LPC) |
| Ig | no | n/a | no | n/a | Assumed so, in absence of other information | M, Me, T, Tn, Te, Ten, Sr, S, I, Ig, In (& LPC) |
| In | no | n/a | no | n/a | Assumed not, in absence of other information | M, Me, T, Tn, Te, Ten, Sr, S, I, Ig, In (& LPC) |

A. Ig state

In order to avoid having to access the LPC to determine whether or not the memory block is known to be cached, if at all, only locally, the Ig (Invalid global) coherency state is utilized to maintain a domain indication in cases in which no copy of a memory block remains cached in a coherency domain. The Ig state is defined herein as a cache coherency state indicating (1) the associated memory block in the cache array is invalid, (2) the address tag in the cache directory is valid, and (3) a copy of the memory block identified by the address tag may possibly be cached in another coherency domain. The Ig indication is preferably imprecise, meaning that it may be incorrect without a violation of coherency.

The Ig state is formed in a lower level cache in response to that cache providing a requested memory block to a requestor in another coherency domain in response to an exclusive access request (e.g., a bus RWITM operation). In some embodiments of the present invention, it may be preferable to form the Ig state only in the coherency domain containing the LPC for the memory block. In such embodiments, some mechanism (e.g., a partial response by the LPC and subsequent combined response) must be implemented to indicate to the cache sourcing the requested memory block that the LPC is within its local coherency domain. In other embodiments that do not support the communication of an indication that the LPC is local, an Ig state may be formed any time that a cache sources a memory block to a remote coherency domain in response to an exclusive access request.

Because cache directory entries including an Ig state carry potentially useful information, it is desirable in at least some implementations to preferentially retain entries in the Ig state over entries in the I state (e.g., by modifying the Least Recently Used (LRU) algorithm utilized to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries and by domain indication scrubbing, as described further below.

Several rules govern the selection and replacement of Ig cache entries. First, if a cache selects an Ig entry as the victim for replacement, a castout of the Ig entry is performed (unlike the case when an I entry is selected). Second, if a request that causes a memory block to be loaded into a cache hits on an Ig cache entry in that same cache, the cache treats the Ig hit as a cache miss and performs a castout operation with the Ig entry as the selected victim. The cache thus avoids avoid placing two copies of the same address tag in the cache directory. Third, the castout of the Ig state is preferably performed as a local operation, or if performed as a global operation, ignored by memory controllers of non-local coherency domains. If an Ig entry is permitted to form in a cache that is not within the same coherency domain as the LPC for the memory block, no update to the domain indicator in the LPC is required. Fourth, the castout of the Ig state is preferably performed as a dataless address-only operation in which the domain indicator is written back to the LPC (if local to the cache performing the castout).

Implementation of an Ig state in accordance with the present invention improves communication efficiency by maintaining a cached domain indicator for a memory block in a coherency domain even when no valid copy of the memory block remains cached in the coherency domain. As a consequence, an HPC for a memory block can service an exclusive access request (e.g., bus RWITM operation) from a remote coherency domain without retrying the request and performing a push of the requested memory block to the LPC.

B. In state

The In state is defined herein as a cache coherency state indicating (1) the associated memory block in the cache array is invalid, (2) the address tag in the cache directory is valid, and (3) a copy of the memory block identified by the address tag is likely cached, if at all, only by one or more other cache hierarchies within the local coherency domain. The In indication is preferably imprecise, meaning that it may be incorrect without a violation of coherency. The In state is formed in a lower level cache in response to that cache providing a requested memory block to a requester in the same coherency domain in response to an exclusive access request (e.g., a bus RWITM operation).

Because cache directory entries including an in state carry potentially useful information, it is desirable in at least some implementations to preferentially retain entries in the In state over entries in the I state (e.g., by modifying the Least Recently Used (LRU) algorithm utilized to select a victim cache entry for replacement). As In directory entries are retained in cache, it is possible for some In entries to become "stale" over time in that a cache whose exclusive access request caused the formation of the In state may itself supply a shared copy of the memory block to a remote coherency domain without notification to the cache holding the address tag of the memory block in the In state. In such cases, the "stale" In state, which incorrectly indicates that a local operation should be issued instead of a global operation, will not cause any coherency errors, but will merely cause some operations to be erroneously first issued as local operations, rather than as global operations. Occurrences of such inefficiencies will be limited in duration by the eventual replacement of the "stale" In cache entries. In a preferred embodiment, cache entries in the In coherency state are not subject to castout, but are instead simply replaced. Thus, unlike Ig cache entries, In cache entries are not utilized to update domain indicators 504 in system memories 108.

Implementation of an In state in accordance with the present invention improves communication efficiency by maintaining a cached domain indicator for a memory block that may be consulted by a master in order to select a local scope for one of its operations. As a consequence, bandwidth on system interconnect 110 and local interconnects 114 in other coherency domains is conserved.

C. Sr state

In the operations described below, it is useful to be able to determine whether or not a lower level cache holding a shared requested memory block in the Sr coherency state is located within the same domain as the requesting master. In one embodiment, the presence of a "local" Sr snooper within the same domain as the requesting master can be indicated by the response behavior of a snooper at a lower level cache holding a requested memory block in the Sr coherency state. For example, assuming that each bus operation includes a range indicator indicating whether the bus operation has crossed a domain boundary (e.g., an explicit domain identifier of the master or a single local/not local range bit), a lower level cache holding a shared memory block in the Sr coherency state can provide a partial response affirming the request in the Sr state only for requests by masters within the same data sourcing domain and provide partial responses indicating the S state for all other requests. In such embodiments the response behavior can be summarized as shown in Table III, where prime (') notation is utilized to designate partial responses that may differ from the actual cache state of the memory block.

TABLE III

| Domain of master of read-type request | Cache state in directory | Partial response (adequate resources available) | Partial response (adequate resources unavailable) |
|---|---|---|---|
| "local" (i.e., within same domain) | Sr | Sr' affirm | Sr' possibly hidden |
| "remote" (i.e., not within same domain) | Sr | S' affirm | S' possibly hidden |
| "local" (i.e., within same domain) | S | S' affirm | S' possibly hidden |
| "remote" (i.e., not within same domain) | S | S' affirm | S' possibly hidden |

Assuming the response behavior set forth above in Table III, the average data latency for shared data can be significantly decreased by increasing the number of shared copies of memory blocks distributed within an SMP data processing system that may serve as data sources.

VII. Exemplary Operation

Figure 6:
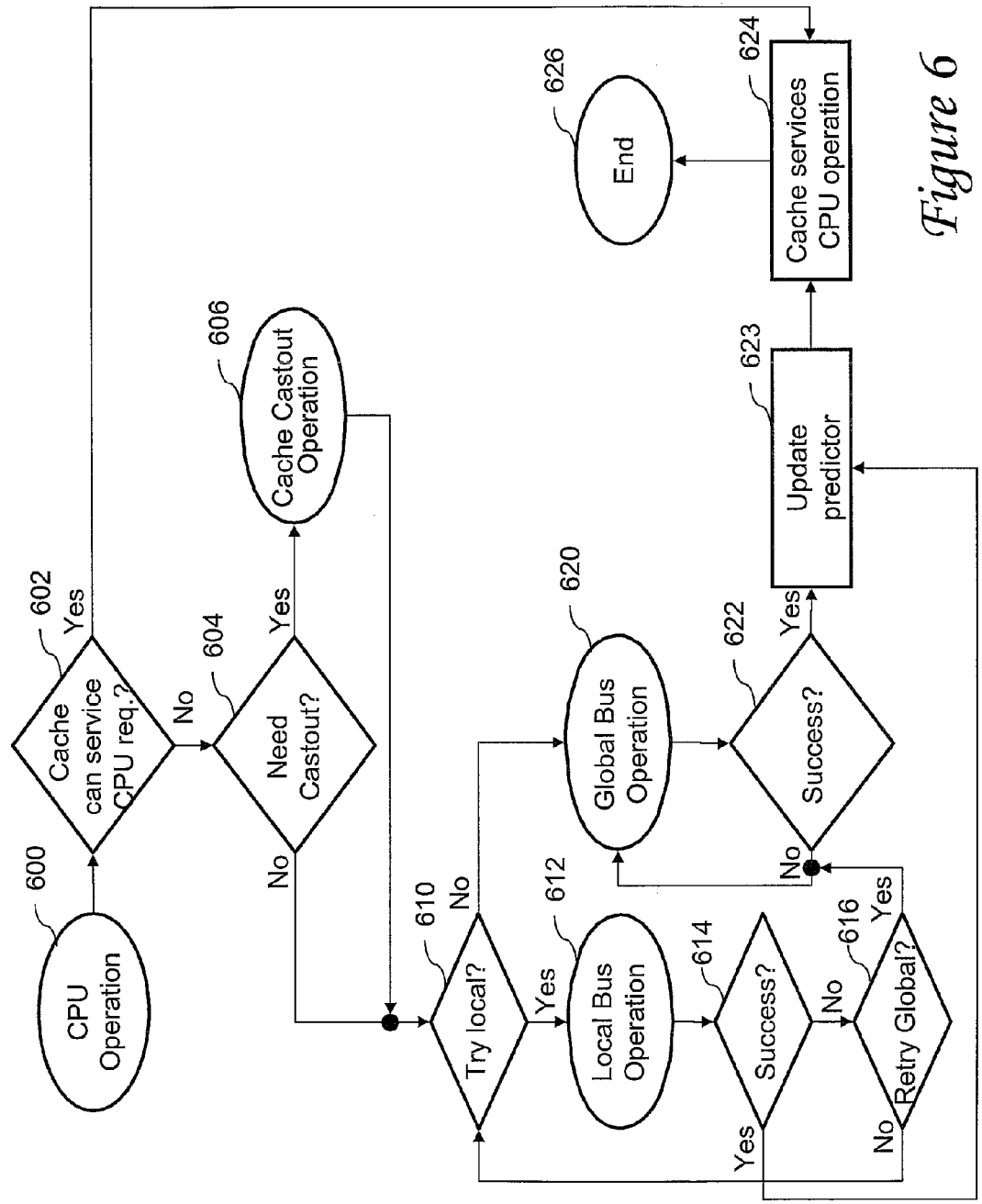
FIG. 6 is a high level logical flowchart of an exemplary method by which a cache memory services an operation received a processor core in a data processing system in accordance with the present invention.

With reference first to FIG. 6, there is depicted a high level logical flowchart of an exemplary method of servicing a processor (CPU) request in a data processing system in accordance with the present invention. As shown, the process begins at block 600, which represents a master 232 in an L2 cache 230 receiving a CPU request (e.g., a CPU data load request, a CPU data store request, a CPU load-and-reserve request, a CPU instruction load request, a CPU prefetch request, etc.) from an associated processor core 200 in its processing unit 104. In response to receipt of the CPU request, master 232 determines at block 602 whether or not the target memory block, which is identified within the CPU request by a target address, is held in L2 cache directory 302 in a coherency state that permits the CPU request to be serviced without issuing a bus operation on the interconnect fabric. For example, a CPU instruction fetch or prefetch request or data load request can be serviced without issuing a bus operation on the interconnect fabric if L2 cache directory 302 indicates that the coherency state of the target memory block is any of the M, Me, Tx (e.g., T, Tn, Te or Ten), Sr or S states. A CPU data store request can be serviced without issuing a bus operation on the interconnect fabric if L2 cache directory 302 indicates that the coherency state of the target memory block is one of the M or Me states. If master 232 determines at block 602 that the CPU request can be serviced without issuing a bus operation on the interconnect fabric, master 232 accesses L2 cache array 300 to service the CPU request, as shown at block 624. For example, master 232 may obtain a requested memory block and supply the requested memory block to the requesting processor core 200 in response to a CPU data load request or instruction fetch request or may store data provided in a CPU data store request into L2 cache array 300. Following block 624, the process terminates at block 626.

Returning to block 602, if the target memory block is not held in L2 directory 302 in a coherency state that permits the CPU request to be serviced without issuing a bus operation on the interconnect fabric, a determination is also made at block 604 whether or not a castout of an existing cache line is required to accommodate the target memory block in L2 cache 230. In one embodiment, a castout operation is required at block 604 if a memory block is selected for eviction from the L2 cache 230 of the requesting processor in response to the CPU request and is marked in L2 directory 302 as being in any of the M, T, Te, Tn or Ig coherency states. In response to a determination at block 604 that a castout is required, a cache castout operation is performed, as indicated at block 606. Concurrently, the master 232 determines at block 610 a scope of a bus operation to be issued to service the CPU request. For example, in one embodiment, master 232 determines at block 610 whether to broadcast a bus operation as a local operation or a global operation.

In a first embodiment in which each bus operation is initially issued as a local operation and issued as a local operation only once, the determination depicted at block 610 can simply represent a determination by the master of whether or not the bus operation has previously been issued as a local bus operation. In a second alternative embodiment in which local bus operations can be retried, the determination depicted at block 610 can represent a determination by the master of whether or not the bus operation has previously been issued more than a threshold number of times. In a third alternative embodiment, the determination made at block 610 can be based upon a prediction by the master 232 of whether or not a local bus operation is likely to be successful in resolving the coherency of the target memory block without communication with processing nodes in other coherency domains. An exemplary implementation of this third alternative embodiment is described in greater detail below with reference to FIGS. 7A-9.

In response to a determination at block 610 to issue a global bus operation rather than a local bus operation, the process proceeds from block 610 to block 620, which is described below. If, on the other hand, a determination is made at block 610 to issue a local bus operation, master 232 initiates a local bus operation on its local interconnect 114, as illustrated at block 612. The local bus operation is broadcast only within the local coherency domain (e.g., processing node 102) containing master 232. If master 232 receives a CR indicating "Success" (block 614), the process passes to block 623, which represents master 232 updating the predictor utilized to make the scope selection depicted at block 610. In addition, master 232 services the CPU request, as shown at block 624. Thereafter, the process ends at block 626.

Returning to block 614, if the CR for the local bus read operation does not indicate "Success", master 232 makes a determination at block 616 whether or the CR is a "Retry Global" CR that definitively indicates that the coherency protocol mandates the participation of one or more processing nodes outside the local coherency domain and that the bus operation should therefore be reissued as a global bus operation. If so, the process passes to block 620, which is described below. If, on the other hand, the CR is a "Retry" CR that does not definitively indicate that the bus operation cannot be serviced within the local coherency domain, the process returns from block 616 to block 610, which illustrates master 232 again determining whether or not to issue a local bus operation to service the CPU request. In this case, master 232 may employ in the determination any additional information provided by the CR. Following block 610, the process passes to either block 612, which is described above, or to block 620.

Block 620 depicts master 230 issuing a global bus operation to all processing nodes 102 in data processing system in order to service the CPU request. If the CR of the global bus read operation does not indicate "Success" at block 622, master 232 reissues the global bus operation at block 620 until a CR indicating "Success" is received. If the CR of the global bus read operation indicates "Success", the process proceeds to block 623 and following blocks, which have been described.

Thus, assuming affinity between processes and their data within the same coherency domain, CPU requests can frequently be serviced utilizing broadcast communication limited in scope to the coherency domain of the requesting master or of other restricted scope less than a full global scope. The combination of data delivery domains as hereinbefore described and coherency domains thus improves not only data access latency, but also reduces traffic on the system interconnect (and other local interconnects) by limiting the scope of broadcast communication.

VIII. Scope Prediction

Figure 7A:
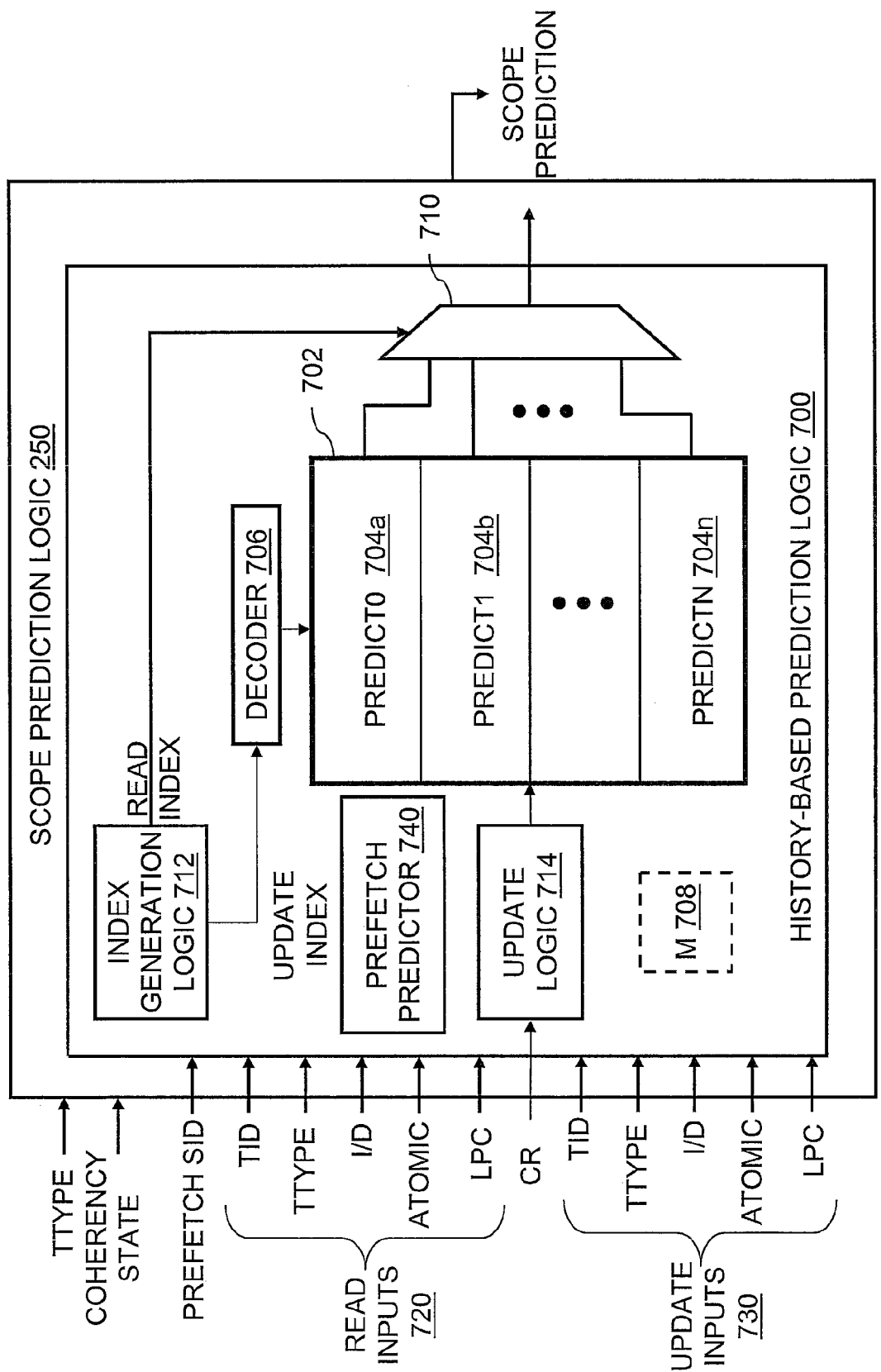
FIG. 7A is a more detailed block diagram of one embodiment of the scope prediction logic depicted in FIG. 2.

With reference now to FIG. 7A, there is illustrated a block diagram representation of an exemplary embodiment of scope prediction logic 250 within the master 232 of an L2 cache 230 in accordance with one embodiment of the present invention. As noted above, scope prediction logic 250 may be employed to perform the scope selection illustrated at blocks 610, 614 and 616 of FIG. 6.

In a preferred embodiment, scope prediction logic 250 includes unillustrated logic for generating static predictions of the scopes of broadcast bus operations. In one embodiment, scope prediction logic 250 generates the static prediction based upon the transaction type (TTYPE) of the bus operation (e.g., read, RWITM, DClaim, DCBZ, write, partial write, prefetch, etc.) to be issued and the current coherency state of the target memory block of the bus operation in the local L2 cache directory 302.

As further illustrated in FIG. 7A, scope prediction logic 250 may advantageously include history-based prediction logic 700, which generates scope predictions for bus operations based upon on the actual scopes of previous bus operations. Because different classes of bus operations tend to exhibit different behaviors, history-based prediction logic 700 separately records historical information for different classes of bus operations. In one embodiment, history-based prediction logic includes a prefetch predictor 740 for predicting the scopes of prefetch operations and a predictor array 702 containing various predictors 704a-704n for predicting the scopes of other classes of operations. In general, if the operations classes are properly constructed, the past behavior of bus operations within each class will serve as an accurate predictor of the scope of future bus operations within the same class.

In one embodiment, each predictor 704 in predictor array 702 is implemented as a counter. Assuming good software affinity, a large majority of bus operations in each operation class should be able to be serviced utilizing only local bus operations. Accordingly, in one embodiment, each counter 704 is initialized to an initial value representing a global operation scope, is updated by update logic 714 for each consecutive bus operation in the associated class that is serviced entirely within the local coherency domain until a threshold (e.g., 3) is reached, and thereafter indicates a local operation scope for bus operations in the associated class until a bus operation in the associated class is serviced by a participant outside the local processing node 102. In that case, the predictor 704 is reset by update logic 714 to its initial value. Thus, in this embodiment, predictors 704 saturate slowly to the prediction of local scope for bus operations, but react quickly to the infrequent occurrence of global bus operations. In other embodiments, predictors 704 may, of course, simply decrement in response to a global bus operation so that predictors 704 saturate to global and local scope predictions at the same rate.

Although good software affinity is typical, in some cases, particular memory blocks or memory pages may exhibit weaker affinity and therefore require a large proportion of global bus operations. Accordingly, history-based prediction logic 700 may optionally include mode field 708, which may be set by hardware (e.g., master 232) or software (e.g., system firmware) to cause one or more of predictors 704a-704n to operate with, or be interpreted as having a reversed bias. With a reversed bias, the initial value of a predictor 704 represents a prediction of local operation scope, the predictor 704 saturates to an indication of global operation scope after a threshold number of operations (e.g., 3) are resolved within the local coherency domain, and the predictor 704 is reset by update logic 714 to a prediction of local scope upon an operation in the associated class being serviced within the local coherency domain.

As will be appreciated, the operation classes corresponding to predictors 704a-704n of predictor array 702 can be constructed utilizing any of a large number of sets of criteria. In one embodiment, these criteria form a set of read inputs 720 and a set of update inputs 730 including a thread identifier (TID), the transaction type (TTYPE) of the bus operation (e.g., read, RWITM, DClaim, DCBZ, write, partial write, etc.), an instruction/data (I/D) indication indicating whether the contents of the target memory block are instructions or data, an atomic indication indicating whether the requested data access relates to an atomic memory update (e.g., whether the CPU request was triggered by the execution of a load-and-reserve or store-conditional instruction by the source processor core 200), and an LPC indication.

The TID, which is preferably received from a processor core 200 as part of, or in conjunction with a CPU request, uniquely identifies the processor thread that issued the CPU request to be serviced. In an embodiment in which multiple processor cores 200 share an L2 cache 230, the TID preferably includes a processor core identifier so that threads of the different processor cores 200 can be disambiguated. For example, for embodiments of processing units 104 including two processor cores 200 that each support two simultaneous hardware threads, the TID may be implemented with 2 bits: 1 bit to identify the source processor core 200 and 1 bit to identify which thread of the processor core 200 issued the CPU request.

The I/D indication is also preferably received by L2 cache 230 from a processor core 200 as part of, or in conjunction with a CPU request. The I/D indication may be generated by an L1 cache 226 based upon whether the CPU request arose from an instruction fetch miss or a data access.

The LPC indication provides an indication of whether or not the LPC for the target memory block resides within the local coherency domain containing the L2 cache 230. The LPC indication may be generated, for example, by BAR register 252 of master 232 in a conventional manner.

From the set of read inputs 720 and update inputs 730, operation classes are constructed based at least partially upon a binary expansion of an index including at least a TTYPE_group field, a TID field, and an LPC field.

The TTYPE_group field identifies a particular group of TTYPEs into which a bus operation falls. In one embodiment, a larger number of TTYPEs of bus operations are represented by a fewer number of TTYPE_groups. The TTYPE_groups may be constructed based upon not only bus operation TTYPEs, but also other information such as the I/D and atomic indications. For example, in one embodiment, the various possible bus operations are represented by four TTYPE_groups—instruction fetch, data fetch, load-and-reserve, and store—which can be advantageously encoded as a 2-bit TTYPE_group field.

As shown in FIG. 7A, history-based prediction logic 700 includes index generation logic 712 for generating read and update indexes utilized to selectively access the predictors 704 within predictor array 702 corresponding to particular operation classes. In an embodiment implementing the four TTYPE_groups defined above, index generation logic 712 generates the 2-bit TTYPE_group field of a read or update index from the bus operation TTYPE and the I/D and atomic indications in accordance with Table IV below (a dash ('-') represents a "don't care"). Index generation logic 712 then forms the complete index by concatenating the TTYPE_group field with the TID and LPC indications.

TABLE IV

| TTYPE | I/D | Atomic | TTYPE_group |
|---|---|---|---|
| READ | I | No | instruction fetch |
| READ | D | No | data fetch |
| READ | D | Yes | load-and-reserve |

TABLE IV-continued

| TTYPE | I/D | Atomic | TTYPE_group |
|---|---|---|---|
| RWITM (Read-With-Intent-To-Modify) | D | — | store |
| DCLAIM (Data Claim) | D | — | store |
| DCBZ (Data Cache Block Zero) | D | — | store |

Assuming that index generation logic 712 generates 5-bit indexes including a 2-bit TTYPE_group field, a 2-bit TID field and a 1-bit LPC field, predictor array 702 may support history-based scope prediction for 32 (i.e., $2^5$) operation classes each having a respective predictor 704. The update index generated by index generation logic 712 can be employed by a decoder 706 to update the value of a particular predictor 704, and the read index can be used by an N-to-1 multiplexer 710 to output the scope prediction of a particular predictor 704. Of course, additional classes and index bits may be implemented based upon other class criteria, for example, bit subranges of the target memory address, etc.

It should further be noted that the number of predictors 704 may, but need not double for each additional bit included within the read and update indexes. Instead, a single counter 704 may be established in association with a particular criteria represented by a dominant bit in the indexes. Decoder 706 and multiplexer 710 may further be implemented to access that corresponding counter 704 when the dominant bit is asserted, irrespective of the values of the other index bits. Such an implementation would be advantageous and desirable in cases in which a particular class criterion is likely to be more determinative of actual scope outcomes than other index bits.

FIG. 7A further depicts that history-based prediction logic 700 is coupled to receive a prefetch stream identified (SID) from its associated processor core 200

Figure 7B:
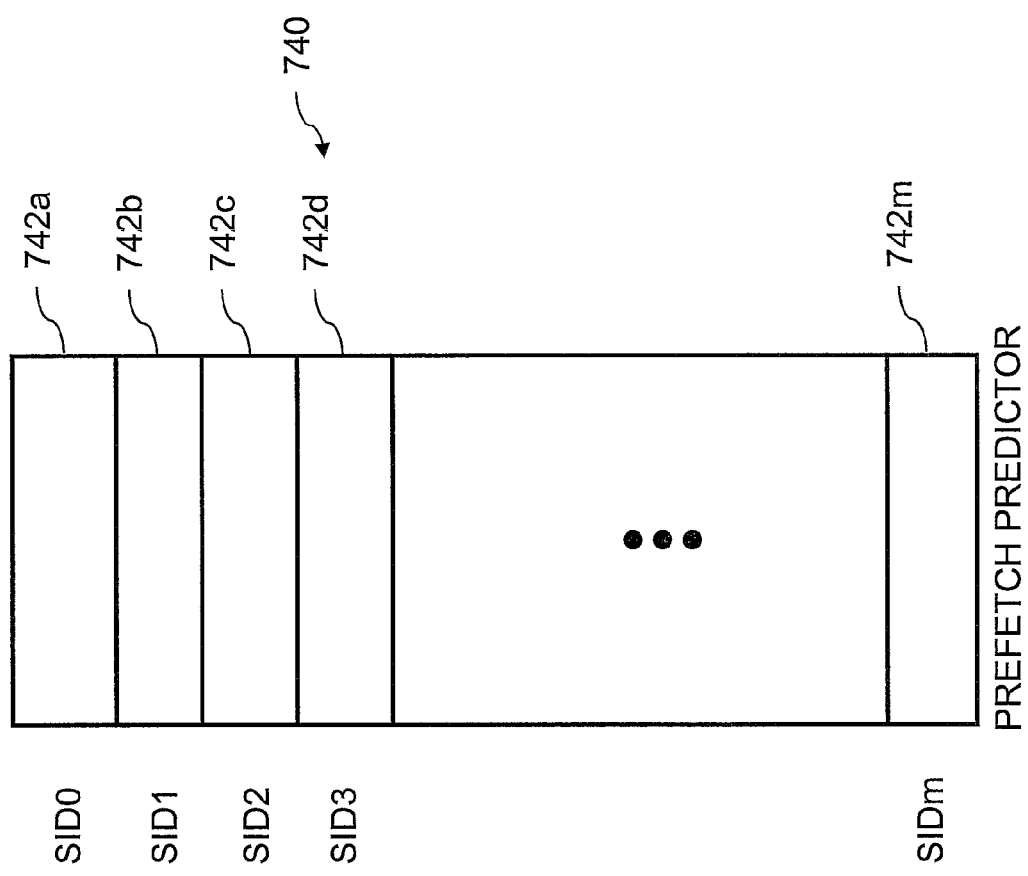
FIG. 7B is a more detailed block diagram of the prefetch predictor of FIG. 7A.

With reference now to FIG. 7B, there is a more detailed block diagram of an exemplary embodiment of prefetch predictor 740 of FIG. 7A. In the exemplary embodiment, prefetch predictor 740 is implemented as an array of M bits 742a-742m, where each bit 742 uniquely corresponds to a particular prefetch stream supported by an associated processor core 200. As depicted, each prefetch stream is identified by a respective prefetch stream identifier (SID), such as SID0, SID1, . . . , SIDM, etc., which is received from the processor core 200 with the prefetch request address, as shown in FIG. 7A. In the depicted embodiment in which processing unit 104 has two processor cores 200 sharing L2 cache 230 and each processor core 200 supports 16 concurrent prefetch streams, the SID can be implemented with 5 bits.

In a preferred embodiment, each bit 742 in prefetch predictor 740 reflects the final scope utilized to fulfill the immediately previous CPU prefetch request in the associated prefetch stream. Thus, for example, if the immediately previous CPU prefetch request was serviced with a bus prefetch operation of global scope, the bit 742 is set to "1", and if the immediately previous CPU prefetch request was serviced with a bus prefetch operation of local scope, the bit 742 is reset to "0". As indicated in FIG. 6, no change is made to a bit 742 if a CPU prefetch request in the associated prefetch stream can be serviced from L2 cache array 300 without issuing a bus prefetch operation.

Utilizing bits 742, prefetch predictor 740 predicts the scopes of subsequent bus prefetch operations. Because prefetch requests conventionally exhibit a sequential reference pattern (i.e., of either ascending or descending cache line addresses), the scope of the previous bus prefetch operation in a given prefetch stream serves as a very high probability indicator of the scope of a next bus prefetch operation that will be required to obtain a next cache line in the prefetch stream.

Figure 8:
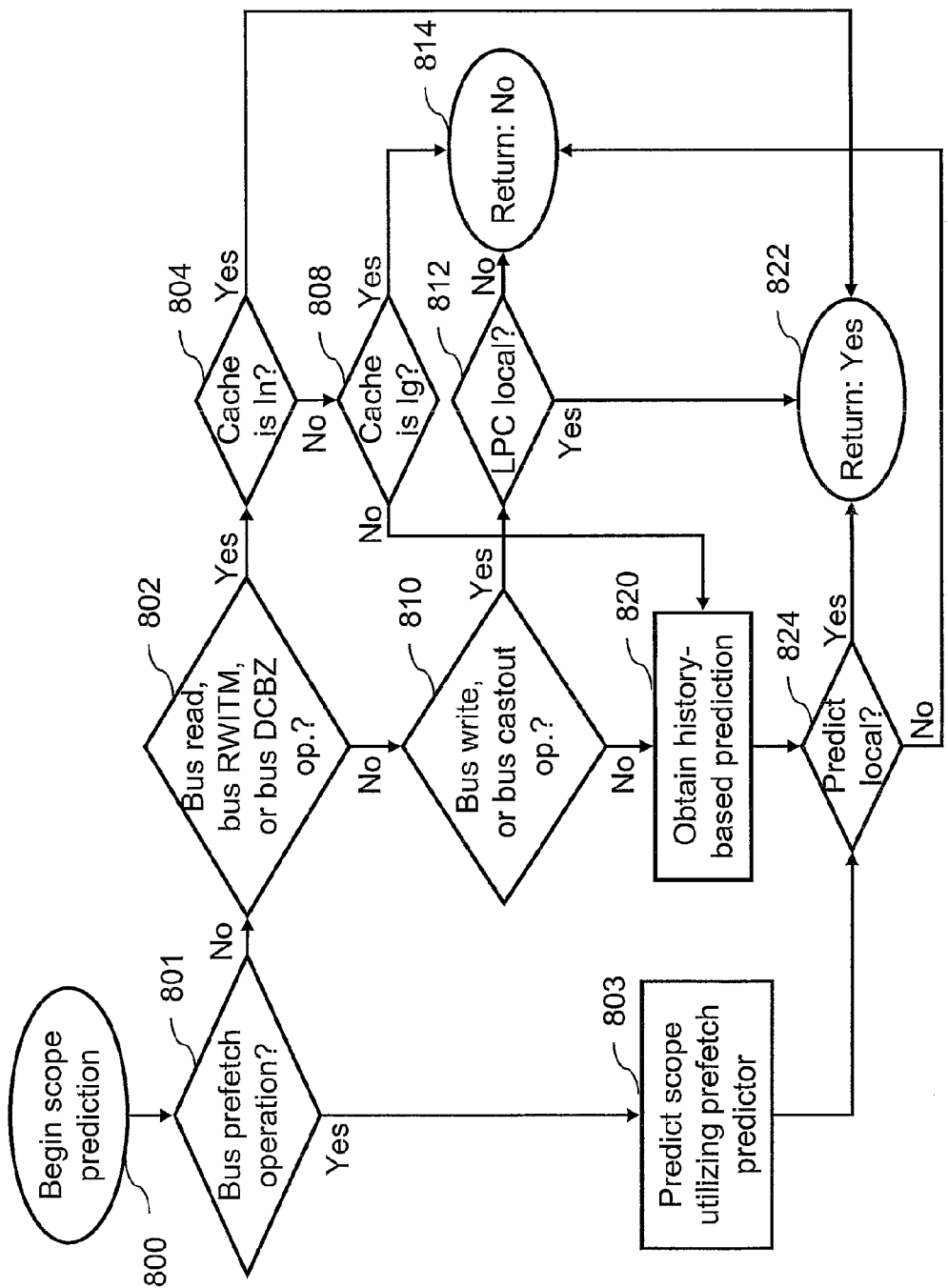
FIG. 8 is a high level logical flowchart of an exemplary process of scope prediction in accordance with the present invention.

Referring now to FIG. 8, there is depicted an exemplary method of scope prediction performed by scope prediction logic 250 in accordance with a preferred embodiment of the present invention. As illustrated, the process begins at block 800, for example, in response to receipt by scope prediction logic 250 at block 610 of FIG. 6 of a TTYPE of a bus operation to be issued, the local coherency state of the target address of the bus operation in the L2 cache directory 302, a set of read inputs 720, and if a prefetch operation, the prefetch stream ID, The process then proceeds to block 801, which illustrates scope prediction logic 250 determining by reference to the TTYPE whether or not the bus operation to be issued by master 232 is a prefetch bus operation. If not, the process passes to block 802, which is described below. If so, the process proceeds to block 803, which depicts scope prediction logic 250 predicting the scope of the bus prefetch operation by reference to prefetch predictor 740. That is, scope prediction logic 250 accesses the particular bit 742 associated with the indicated prefetch SID to determine whether to predict a local ("0") or global ("1") scope for the prefetch bus operation. Following block 803, the process passes to block 824, which depicts scope prediction logic 250 providing a local scope prediction (block 822) if prefetch predictor 740 indicates a local scope and provides a global scope prediction (block 814) if prefetch predictor 740 indicates a global scope.

Referring now to block 802, if the bus operation to be issued is not a bus prefetch operation, scope prediction logic 250 determines if the TTYPE input indicates that the bus operation to be issued by master 232 is a bus read, bus RWITM or bus DCBZ operation. If not, the process proceeds to block 810, which is described below. If, on the other hand, the TTYPE input indicates that the bus operation to be issued is a bus read, bus RWITM or bus DCBZ operation, unillustrated logic within scope prediction logic 250 preferentially predicts the scope of the bus operation based upon the local coherency state of target memory block, if possible.

That is, if the coherency state input indicates that the coherency state of the target address with respect to the local L2 cache directory 302 is In, scope prediction logic 250 predicts a local scope for the bus operation, as shown at blocks 804 and 822. Alternatively, if the coherency state input indicates that the coherency state of the target address with respect to the local L2 cache directory 302 is Ig, scope prediction logic 250 predicts a global scope for the bus operation, as shown at blocks 808 and 814. Alternatively, if the target address is not associated with an In or Ig coherency state in the L2 cache directory 302, scope prediction logic 250 preferably predicts the scope of the bus operation utilizing history-based prediction logic 700, as depicted at block 820 and described in greater detail below with reference to FIG. 9.

Referring now to block 810, if scope prediction logic 250 determines that the bus operation to be issued is a bus write or bus castout operation, unillustrated logic within scope prediction logic 250 preferably predicts the scope of the bus operation based upon the LPC input, as illustrated at block 812. Thus, scope prediction logic 250 predicts a global scope for the bus operation (block 814) if the LPC input indicates that the LPC for the target address is not within the local processing node 104, and predicts a local scope for the bus operation (block 822) otherwise.

Referring again to block 810, if the TTYPE input indicates that the bus operation is another type of operation, for example, a bus DClaim operation, scope prediction logic 250 preferably predicts a scope for the bus operation utilizing history-based prediction logic 700, as illustrated at block 820. As depicted by decision block 824, in such cases, scope prediction logic 250 provides a local scope prediction (block 822) if history-based prediction logic 700 indicates a local scope and provides a global scope prediction (block 814) if history-based prediction logic 700 indicates a global scope.

Figure 9:
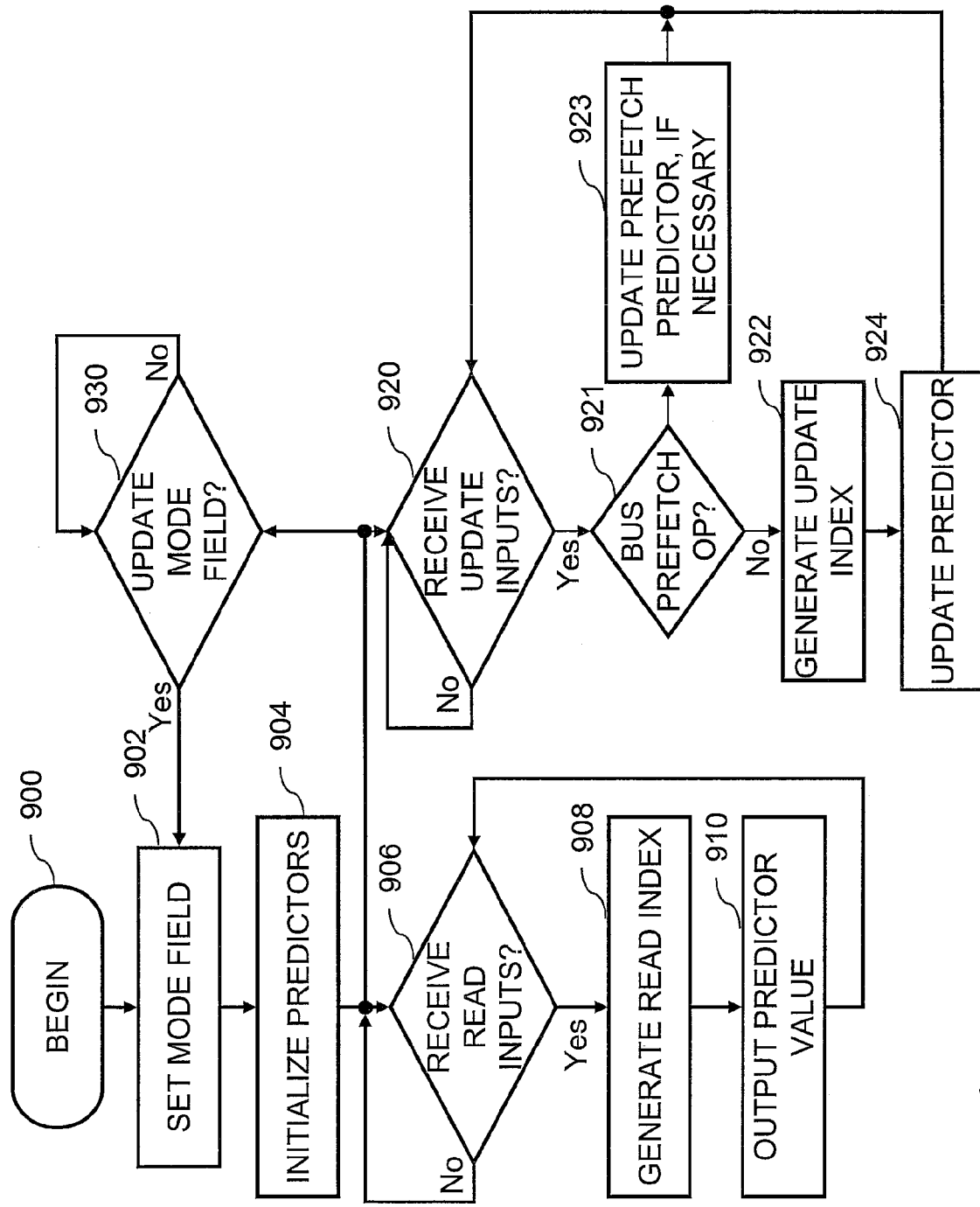
FIG. 9 is a more detailed logical flowchart of an exemplary process of history-based scope prediction in accordance with the present invention.

With reference now to FIG. 9, there is illustrated a more detailed logical flowchart of an exemplary process of history-based scope prediction in accordance with the present invention. In the embodiment of FIG. 7A, the illustrated process is implemented by history-based prediction logic 700.

As depicted, the process begins at block 900 and thereafter proceeds to blocks 902 and 904, which respectively depict the initialization of mode field 708 and predictors 704, for example, as part of hardware power-on reset operations and/or firmware initialization procedures. Thereafter, the process trifurcates and proceeds in parallel to each of blocks 906, 920 and 930.

Block 906 represents history-based prediction logic 700 iterating until a set of read inputs 720 associated with a prospective non-prefetch bus operation to be issued is received. When such a set of read inputs 720 is received, index generation logic 712 generates a read index, as depicted at block 908. In response to receipt of the read index, multiplexer 710 selects and outputs from predictor array 702 the value of a particular predictor 704 corresponding to the operation class identified by the read index, as shown at block 910. If scope prediction logic 250 has selected history-based prediction for the current bus operation, for example, in accordance with the method of FIG. 8, scope prediction logic 250 determines the scope prediction by reference to the predictor value and the value of mode field 708, if present. For example, assuming the mode field 708, if present, is set so that the relevant predictor 704 has a default bias, scope prediction logic 250 predicts a global scope if the predictor value is below the saturating threshold and predicts a local scope if the predictor value is at or above the saturating threshold. The prediction is reversed if the mode field 708 is set so that the relevant predictor 704 has a reverse bias. Following block 910, the process returns to block 906.

Referring now to block 920, history-based prediction logic 700 iterates at block 920 until a set of update inputs 730 is received from master 232 that describe a bus operation for which a combined response indicating "Success" has been received on the local interconnect 114. (Master 232 maintains state for each bus operation until it completes successfully.) In response to receipt of the set of update inputs 730, history-based prediction logic 700 determines by reference to the TTYPE if the bus operation was a bus prefetch operation (block 921). If not, the process passes to block 922, which is described below. If so, history-based prediction logic 700 updates the appropriate bit 742 of prefetch predictor 740, if necessary. As noted above, because prefetch operations typically exhibit a sequential reference pattern, such updates are infrequent in practice, Following block 923, the process returns to block 920.

Referring now to block 922, if history-based prediction logic 700 determines at block 921 that the completed bus operation is not a bus prefetch operation, index generation logic 712 generates an update index for the bus operation for which the combined response was received. Next, as illustrated at block 924, update logic 714 utilizes the combined response that was received for the bus operation to generate an update for a predictor 704, which update is applied to the predictor 704 selected by decoder 706 in response to receipt of the update index from index generation logic 712. In particular, if the "Success" CR indicates that the bus operation was serviced by a snooper 122, 236 in the local coherency domain, update logic 714 outputs a counter increment signal. If the "Success" CR indicates that the bus operation was serviced by a snooper 122, 236 outside of the local coherency domain, update logic 714 outputs a counter reset signal. The interpretation of these update signals is reversed if mode field 708 indicates that the counter 704 to which the update signal is to be applied is operating with a reversed bias. Following block 922, the process returns to block 920.

With reference now to block 930, history-based prediction logic 700 iterates at block 930 until an update to mode field 930 is received. In response to receipt of an update to mode field 708, history-based prediction logic 700 updates mode field 708 to correctly reflect which predictors 704 are operating with a forward bias and which predictors 704 are operating with a reversed bias, as indicated at block 902. In addition, the predictor(s) 704 affected by the update to mode field 704 are initialized at block 904. Thereafter, the process thereafter returns to block 930.

As has been described, the present invention provides an improved method and system for selecting or predicting a scope of a broadcast operation transmitted on an interconnect of a data processing system. In accordance with the present invention, the scope of at least some broadcast operations are predicted by reference to the actual scopes of previous successful broadcast operations. History-based prediction may be enhanced by maintaining separate historical indications of operation scope for different classes of operations.

While the invention has been particularly shown as described with reference to a preferred embodiment, it will be understood by those skilled in the art that various changes in form and detail may be made therein without departing from the spirit and scope of the invention.

What is claimed is:

1. A cache memory for a data processing system including an interconnect fabric and at least first and second coherency domains each containing at least one processing unit, said cache memory comprising:
   a data array;
   a cache directory of contents of said data array; and
   a cache controller including a prefetch predictor that determines a predicted scope of broadcast on the interconnect fabric for a first prefetch operation having a first target address based upon a scope of a previous second prefetch operation having a different second target address, wherein said cache controller issues said first prefetch operation on the interconnect fabric with said predicted scope;
   wherein:
      said cache memory belongs to said first coherency domain; and
      said prefetch predictor selects a first scope of broadcast including both said first and second coherency domains in response said previous second operation being serviced by a memory in said second coherency domain and selects a second scope of broadcast including said first coherency domain and excluding said second coherency domain in response to said second previous operation being serviced by a memory outside said second coherency domain.

2. The cache memory of claim 1, wherein said cache controller updates the prefetch predictor based upon a location in the data processing system of a memory that services said first prefetch operation.

3. The cache memory of claim 1, wherein:
   said cache controller receives one of a plurality of prefetch stream identifiers with a prefetch request; and
   said prefetch predictor maintains a respective scope indicator for each of said plurality of prefetch stream identifiers.

4. The cache memory of claim 3, wherein each respective scope indicator is a single bit indicator.

5. A processing unit, comprising:
   a cache memory in accordance with claim 1; and
   at least one processor core coupled to said cache memory.

6. A data processing system, comprising:
   at least first and second coherency domains each containing at least one processing unit;
   an interconnect fabric coupling said first and second coherency domains; and
   a cache memory within the first coherency domain, said cache memory comprising:
      a data array;
      a cache directory of contents of said data array; and
      a cache controller including a prefetch predictor that determines a predicted scope of broadcast on the interconnect fabric for a first prefetch operation having a first target address based upon a scope of a previous second prefetch operation having a different second target address, wherein said cache controller issues said first prefetch operation on the interconnect fabric with said predicted scope, and wherein said prefetch predictor selects a first scope of broadcast including both said first and second coherency domains in response said previous second operation being serviced by a memory in said second coherency domain and selects a second scope of broadcast including said first coherency domain and excluding said second coherency domain in response to said second previous operation being serviced by a memory outside said second coherency domain.

7. The data processing system of claim 6, wherein said cache controller updates the prefetch predictor based upon a location in the data processing system of a memory that services said first prefetch operation.

8. The data processing system of claim 6, wherein:
   said cache controller receives one of a plurality of prefetch stream identifiers with a prefetch request; and
   said prefetch predictor maintains a respective scope indicator for each of said plurality of prefetch stream identifiers.

9. The data processing system of claim 8, wherein each respective scope indicator is a single bit indicator.

10. A method of data processing in a data processing system including an interconnect fabric and at least first and second coherency domains each containing at least one processing unit, said method comprising:
   receiving a prefetch request specifying a first target address;
   in response to receiving the prefetch request, determining a predicted scope of broadcast on the interconnect fabric for a first prefetch operation having a first target address based upon a scope of a previous second prefetch operation having a different second target address, wherein said determining comprises selecting as the predicted scope a first scope of broadcast including both said first and second coherency domains in response said previous second operation being serviced by a memory in said second coherency domain and selecting as the predicted scope a second scope of broadcast including said first coherency domain and excluding said second coherency domain in response to said second previous operation being serviced by a memory outside said second coherency domain; and issuing said first prefetch operation on the interconnect fabric with said predicted scope.

11. The method of claim 10, and further comprising:

maintaining the scope of the previous second prefetch operation in a prefetch predictor; and updating the prefetch predictor based upon a location in the data processing system of a memory that services said first prefetch operation.

12. The method of claim 10, and further comprising:

said prefetch predictor maintaining a respective scope indicator for each of a plurality of prefetch stream identifiers; and receiving one of a plurality of prefetch stream identifiers in association with the prefetch request;

wherein said determining comprises determining said predicted scope by reference to the respective scope indicator for said one of said plurality of prefetch stream identifiers.

13. The method of claim 12, wherein each respective scope indicator is a single bit indicator.

* * * * *